(12) United States Patent
Farmer et al.

(10) Patent No.: US 11,761,738 B2
(45) Date of Patent: Sep. 19, 2023

(54) ENVIRONMENTALLY FRIENDLY TOY PROJECTILES (71) Applicants: Lucy J Farmer, Ithaca, NY (US); Jasper J Farmer, Ithaca, NY (US); Jay J Farmer, Ithaca, NY (US)

(72) Inventors: Lucy J Farmer, Ithaca, NY (US); Jasper J Farmer, Ithaca, NY (US); Jay J Farmer, Ithaca, NY (US)

( * ) Notice: Subject to any disclaimer, the term of this patent is extended or adjusted under 35 U.S.C. 154(b) by 580 days.

(21) Appl. No.: 16/833,664

(22) Filed: Mar. 30, 2020

(65) Prior Publication Data
US 2021/0302138 A1  Sep. 30, 2021

(51) Int. Cl.
*F42B 6/04* (2006.01)
*A01C 14/00* (2006.01)
*F42B 6/00* (2006.01)
*A01C 21/00* (2006.01)
*A01C 7/02* (2006.01)
*A01C 7/06* (2006.01)
*A01C 7/08* (2006.01)

(52) U.S. Cl.
CPC .............. *F42B 6/003* (2013.01); *A01C 7/02* (2013.01); *A01C 7/06* (2013.01); *A01C 7/08* (2013.01); *A01C 14/00* (2013.01); *A01C 21/00* (2013.01); *F42B 6/04* (2013.01)

(58) Field of Classification Search
CPC ... A01C 7/08; A01C 14/00; F42B 6/04; F42B 6/08
See application file for complete search history.

(56) References Cited

U.S. PATENT DOCUMENTS

| | | | | |
|---|---|---|---|---|
| 4,031,832 | A * | 6/1977 | Edwards | A01C 11/006 47/73 |
| 6,516,565 | B1 * | 2/2003 | Fima | B64D 1/16 47/84 |
| 8,568,257 | B2 * | 10/2013 | Pierce | F42B 12/36 473/581 |
| 8,683,742 | B1 * | 4/2014 | Cox | A01C 1/04 47/57.6 |
| 9,500,452 | B1 * | 11/2016 | Donahoe | F42B 12/385 |
| 11,304,380 | B2 * | 4/2022 | Patrick | A01G 9/0291 |
| 2006/0265952 | A1 * | 11/2006 | Christal | A01C 1/04 47/65.7 |
| 2007/0193914 | A1 * | 8/2007 | Scarabino | B65D 65/466 206/524.7 |
| 2010/0263274 | A1 * | 10/2010 | Corak | A01H 4/006 47/57.6 |
| 2016/0234997 | A1 * | 8/2016 | Camacho | A01C 11/00 |
| 2021/0053681 | A1 * | 2/2021 | Zvara | A01G 9/0293 |

* cited by examiner

Primary Examiner — John A Ricci (57) ABSTRACT

The present invention provides biodegradable projectiles for toy launchers that contain viable seeds. When lost outdoors the projectiles do not pollute the environment but instead degrade naturally and the seeds grow into plants that enhance the landscape.

20 Claims, 4 Drawing Sheets

ENVIRONMENTALLY FRIENDLY TOY PROJECTILES

FIELD OF THE INVENTION

This invention pertains generally to projectiles for toy weapons and more specifically to environmentally benign projectiles that are biodegradable and which contain viable seeds such as those of wildflowers so that their decomposition leads to an environmental benefit.

BACKGROUND OF THE INVENTION

Toys that shoot or launch plastic or foam projectiles such as darts, balls or missiles have grown in popularity in recent years. Such toys are typically provided with a large number of projectiles and the manufacturers of the toys sell packages of additional projectiles as consumables. The projectiles wear out or become damaged with repeated use, and it is a common occurrence during play (particularly outdoors) that the projectiles are lost. This is problematic since the projectiles are made out of petroleum-derived materials and thus become a persistent form of litter that can negatively impact the environment and wildlife. Such projectiles do not readily biodegrade, but do disintegrate into small persistent particles of plastic which are known to cause long term harms to aquatic life. In addition to these environmental harms, the loss of projectiles also has negative impacts on players. Searching for lost projectiles can be time consuming and may cause frustration and anxiety (for the players or their parents). Even if the projectiles are not lost, the post-consumer fate of such disposable petroleum-based projectiles is also of concern. Prior art projectiles are neither biodegradable, nor recyclable and therefore are discarded in the trash when they wear out or are damaged. In the best case, such discarded projectiles are landfilled, though many also unintentionally end up as litter.

The present invention provides solutions to these and related problems.

SUMMARY OF THE INVENTION

In one aspect, the present invention provides biodegradable projectiles for toy guns and similar toys. The projectiles contain viable seeds which germinate and grow when the projectile degrades. The projectiles are an environmentally benign alternative to existing foam and plastic toy projectiles which create long lasting litter and harm wildlife.

In certain embodiments, the invention provides biodegradable projectile darts designed to be compatible with existing foam dart launchers and similar toys. These dart launching toys are designed to propel lightweight cylindrical 'darts' made of flexible polymer foam. The polymer darts are soft and light enough to safely launch at playmates in mock battles and these toys are therefore commonly used in chaotic outdoor play scenarios that make the loss of projectiles difficult to avoid. In certain embodiments, the provided projectiles comprise biodegradable darts compatible with existing toys designed to shoot such flexible polymer foam darts. In certain embodiments, the inventive darts are biodegradable, contain viable plant seeds, and are of suitable weight, shape, resiliency, and dimensional tolerances that they can be effectively launched from toys designed to propel prior art petroleum-derived foam darts.

In another embodiment, the present invention provides biodegradable spherical projectiles designed to be launched from toy guns. In certain embodiments, the present invention provides biodegradable rigid spherical projectiles for launch from toy guns and similar toy weapons. In certain embodiments, the projectiles are characterized in that they have a diameter less than about 10 mm (e.g. 6, or 8 mm BBs). This embodiment provides an environmentally friendly alternative to available rigid plastic ammunition sold for existing toy guns and launchers.

In certain embodiments, the present invention provides biodegradable spherical foam projectiles for launch from toy launchers and similar toy weapons. In certain embodiments, the spherical foam projectiles are characterized in that they have a diameter greater than about 10 mm. For example, a diameter between about 10 and 50 mm, between about 10 and 40 mm, between about 10 and 30 mm, between about 20 and 30 mm, between about 20 and 25 mm, or between about 30 and 40 mm. In certain embodiments, such spherical projectiles are composed of a biodegradable foam or similar low-density biodegradable composition. In certain embodiments, provided spherical foam projectiles comprise two or more layers comprising different materials. In certain embodiments, such projectiles comprise a spherical core covered by one or more spherical layers. In certain such embodiments, at least one of the layers is not a foam. In certain embodiments, the outermost layer of the projectile comprises a foam and one or more inner layers are not a foam. In certain embodiments, provided spherical projectiles are hollow. In certain embodiments, provided spherical projectiles comprise a composite of material containing smaller particles of one or more materials randomly or regularly distributed in a matrix of a distinct first material.

DETAILED DESCRIPTION OF CERTAIN EMBODIMENTS

In one aspect, present invention provides biodegradable projectiles for toy launchers, blasters, guns and similar toys.

Figure 1:
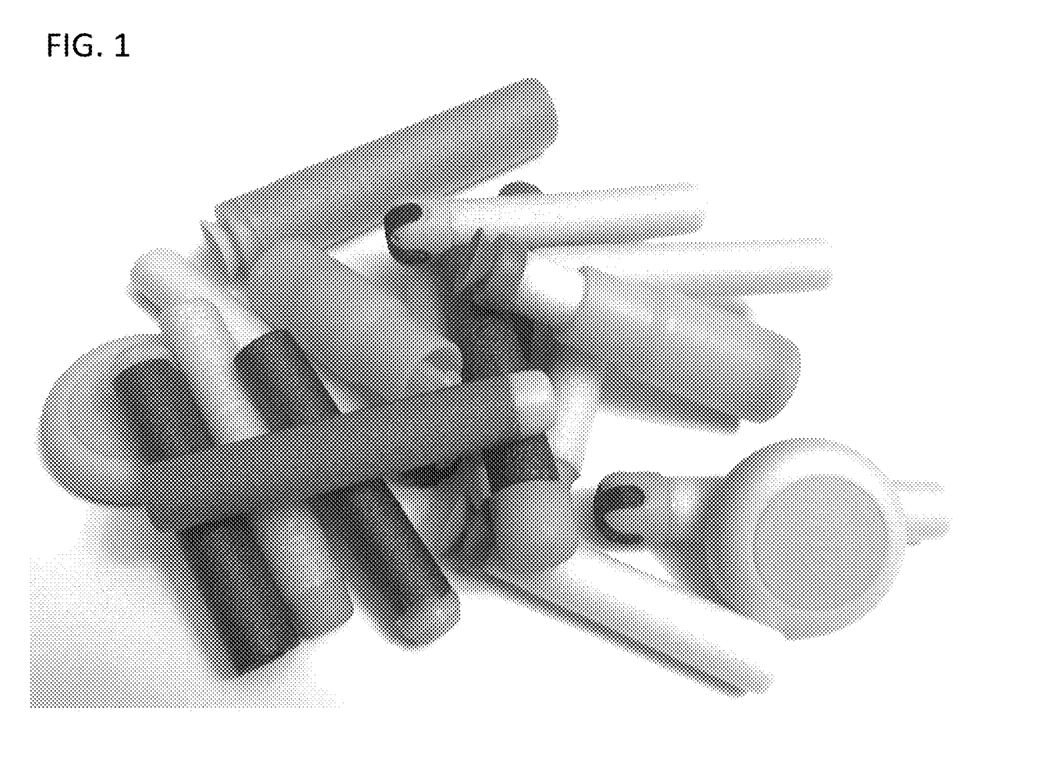
FIG. 1 shows a photograph of representative prior art projectiles that can be replaced by projectiles of the present invention.

In certain embodiments, the inventive projectiles contain viable plant seeds and are designed to degrade under natural conditions and to thereby disperse the contained seeds which will then germinate and grow providing an environmental benefit. The projectiles are an environmentally friendly alternative to currently available projectiles made out of petroleum-derived materials such as plastic, synthetic rubber, or polymer foams. As described above, when lost or discarded, these prior art projectiles become long-lasting environmental waste that can harm wildlife or persist as unsightly litter for many years. Because of their small size and light weight, such projectiles are easily washed into waterways and can be carried long distances becoming persistent aquatic or marine pollution. FIG. 1 is a photograph of an assortment of commercially available prior art toy projectiles that suffer from the shortcomings described above.

Shapes of Projectiles

In certain embodiments, the present invention is directed to projectiles that have a specific well-controlled shape and defined dimensional tolerances such that they are usable with launching toys designed to propel a specific type of petroleum-derived projectile (i.e. such as those pictured in FIG. 1)—this is in contrast to toys such as sling-shots or bows that can launch projectiles having a wide variety of shapes and compositions. In certain embodiments, ammunition for such non-specific launching toys are outside the scope of the present invention. Examples of toys that rely on projectiles with specific shape and tolerance requirements include, but are not limited to: toy launchers that propel foam darts or balls; toy guns that shoot plastic discs, pellets or spheres; paintball guns; air-powered rocket launchers and the like.

A particularly useful embodiment of the invention provides biodegradable projectile darts designed to be compatible with existing foam dart launchers and similar toys. These dart launching toys are designed to propel lightweight cylindrical 'darts' made of flexible polymer foam. The polymer darts are soft and light enough to safely launch at playmates in mock battles and these toys are therefore commonly used in chaotic outdoor play scenarios that make the loss of projectiles difficult to avoid. In certain embodiments, the provided projectiles comprise biodegradable darts compatible with existing toys designed to shoot such flexible polymer foam darts. In certain embodiments, the inventive darts are biodegradable, contain viable plant seeds, and are of suitable weight, shape, resiliency, and dimensional tolerances that they can be effective launched from toys designed to propel prior art petroleum-derived foam darts.

In certain embodiments, the inventive projectiles are generally similar in shape to existing foam dart projectiles that are meant to be accelerated in a direction parallel to their length by a spring force or air pressure applied by a suitable launching toy. In certain embodiments, such projectiles comprise an elongate body which is substantially linear. In certain embodiments, the substantially linear elongate body of the projectile has a cylindrical shape. In certain embodiments, such cylindrical projectiles have a circular cross section with a cross-sectional diameter smaller than the length of the projectile. In certain embodiments, such projectiles have an aspect ratio (i.e. length/diameter ratio) of between about 2 and about 20. In certain embodiments, the projectiles have an aspect ratio between about 3 and 15, between about 3 and 10, between about 4 and 8, between about 5 and 7, or between about 6 and 8. In certain embodiments, the projectiles have an aspect ratio of about 6.

The elongate body of the provided projectile may be solid, or at least a portion of the elongate body may be hollow. In certain embodiments, the elongate body is tubular (i.e. its center is hollow). In certain embodiments, only a portion of the body is tubular. In certain such embodiments, a first end of the tubular elongate body is open, while a second end of the tubular elongate body is closed (or is attached to another component that obstructs the opening at the other end of the tubular body). In certain embodiments, the provided projectiles comprise an elongate tubular body with a tip disposed at one end such that it closes the tube at that end.

In certain embodiments, the projectile has a diameter between about 0.3 to 1.5 inch and a length of between about 2 and about 10 inches. In certain embodiments, the projectile has a diameter between about 0.3 to 1 inch and a length of between about 2 and about 6 inches.

In certain embodiments, the inventive projectiles are compatible with foam dart launchers designed for darts having a nominal diameter of about 0.5 inches. In certain embodiments, the projectile has a diameter of about 0.5 inches and a length of between about 2.5 and 3 inches. In certain embodiments, the projectile has a diameter of 0.5 inches and a length of between about 2.55 and 2.95 inches. In certain embodiments, the projectile has a diameter of 0.5 inches and a length of between about 2.65 and 2.85 inches. In certain embodiments, the projectile has a diameter of 0.5 inches and a length of about 2.85 inches. In certain embodiments, the projectile has a diameter of 0.5 inches and a length of about 2.89 inches.

In certain embodiments, the inventive projectiles are compatible with foam dart launchers designed for darts having a nominal diameter of 0.4 inches. In certain embodiments such darts have a diameter of 0.4 inches and a length of between about 2.8 and 3.0 inches, or between 2.85 and 2.95 inches. In certain embodiments, a projectile has a diameter of about 0.4 inches and a length of between about 2.5 and 3 inches. In certain embodiments, a projectile has a diameter of 0.4 inches and a length of between about 2.55 and 2.95 inches. In certain embodiments, a projectile has a diameter of 0.4 inches and a length of between about 2.75 and 2.95 inches. In certain embodiments, a projectile has a diameter of 0.4 inches and a length of between about 2.8 and 2.9 inches. In certain embodiments, a projectile has a diameter of 0.4 inches and a length of about 2.85 inches.

In certain embodiments, the inventive projectiles are compatible with foam dart launchers designed for darts having a nominal diameter of 0.7 and 0.8 inches. In certain embodiments, the inventive projectiles are compatible with foam dart launchers designed for darts having a nominal diameter of 0.75 inches. In certain embodiments, a projectile has a diameter of about 0.75 inches and a length of between about 3 and 5 inches. In certain embodiments, a projectile has a diameter of about 0.75 inches and a length of between about 3.5 and 4.5 inches. In certain embodiments, a projectile has a diameter of about 0.75 inches and a length of between about 3 and 4 inches. In certain embodiments, a projectile has a diameter of 0.75 inches and a length of between about 3.4 and 2.8 inches. In certain embodiments, a projectile has a diameter of 0.75 inches and a length of between about 3.5 and 3.7 inches. In certain embodiments, a projectile has a diameter of 0.75 inches and a length of about 3.65 inches.

In another aspect, the present invention provides a pack containing a plurality of projectiles compatible with toy launchers designed for foam darts. In certain embodiments, such packs are characterized in that each projectile in the pack has substantially the same dimensions. In certain embodiments, such packs comprise more than 3, more than 6, more than 10, more than 25, more than 50 or more than 100 projectiles. In certain embodiments, such packs are characterized in that the individual projectiles vary in at least one dimension by less than +/−10% of, by less than +/−5%, by less than +/−2%, by less than +/−1%, by less than +/−0.5%, by less than +/−0.25%, by less than +/−0.10%, by less than +/−0.05%, or by less than +/−0.01% of the dimension.

In certain embodiments, provided dart-like projectiles comprise a tip disposed at one end of the elongate body. In certain embodiments, the tip is integral to the elongate body (e.g. the body and tip are monolithic) while in other embodiments, the tip may be a distinct component that has structural, compositional, or aesthetic differences that distinguish it from the elongate body to which it is attached. In certain embodiments, the tip has circular cross section. In certain embodiments, the tip has a rotational axis of symmetry colinear with the central length axis of the elongate body. In certain embodiments of such rotationally symmetric tips, a cross section of the tip through its rotational axis of symmetry may be rectangular, trapezoidal, semicircular, parabolic or curvilinear. In certain embodiments, the tip is hemispherical. In certain embodiments, the tip has a conical or truncated conical shape. In certain embodiments, the tip has a truncated conical shape and the edge formed by the intersection of the plane truncating the cone is radiused or beveled. In certain embodiments, the tip is cylindrical. In certain embodiments the tip is dome shaped. In certain embodiments, the tip comprises grooves, ridges or other features that cause the projectile to rotate when accelerated longitudinally in a tip-first orientation.

Figure 2A:
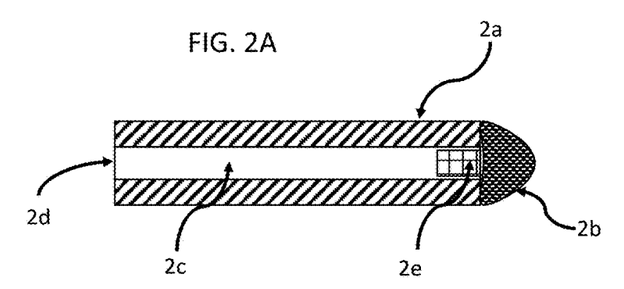
FIG. 2A shows a longitudinal section view of a shape of a projectile according to certain embodiments of the present invention.
Figure 2B:
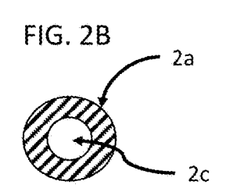
FIG. 2B shows an axial cross section of the projectile of FIG. 2A.
Figure 2C:
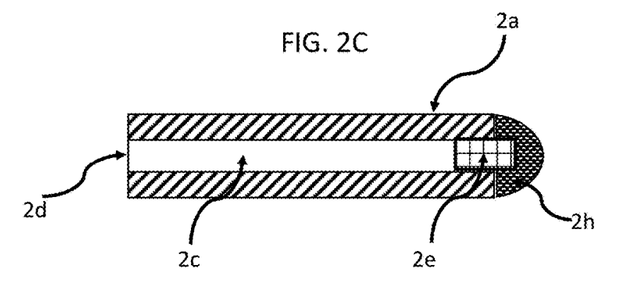
FIG. 2C. shows a longitudinal section view of an alternative construction of a projectile according to certain embodiments of the present invention.
Figure 2D:
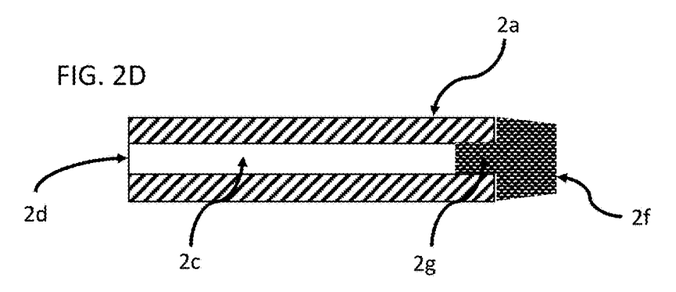
FIG. 2D shows a longitudinal section view of an alternative construction of a projectile according to certain embodiments of the present invention.

FIGS. 2A through 2D, illustrate features of representative biodegradable projectile darts according to certain embodiments of the present invention. FIG. 2A depicts a cross section of a projectile dart having a tubular elongate body 2a, a tip 2b, an internal hollow 2c and an open end 2d. In this example, the elongate body 2a is tubular with a circular cross section, and end 2d is open to hollow interior 2c. The arrangement of the hollow interior 2c to elongate body 2a is more clearly seen in the section view of FIG. 2B. The elongate body in this example has a wall thickness that is approximately ⅓ of the outside diameter of the elongate body 2a. In certain embodiments, the actual diameter of the elongate body 2a and its wall thickness (which determines the diameter of hollow interior 2c) are sized to match tolerances required by a toy launcher with which the projectile is intended to be compatible—specifically, the diameter of the elongate body is selected to have a suitable sliding fit in the barrel of the launcher and the diameter and length of the hollow interior 2c are sized to properly engage with the propulsion mechanism of such a toy launcher. The tip 2b, as shown in this example has a parabolic profile. FIG. 2A also depicts an optional cylindrical element 2e adjacent to the tip 2b and occupying a portion of the center hole of the cylindrical body this can contain seeds, fertilizer or other materials beneficial during biodegradation of the dart. This element has a diameter approximately equal to the diameter of the hole in the center of the tubular elongate body 2a. A similar arrangement is illustrated in FIG. 2C, in this projectile the cylindrical element 2e fits into a hole provided in the back of tip 2h, this arrangement helps secure the tip to the elongate body 2a and provides registration to align the parts. In certain embodiments, the cylindrical element 2e contains viable seeds. In certain embodiments, the cylindrical element 2e contains soil, fertilizer, or similar materials. FIG. 2D shows an alternative tip construction. In this illustration, the tip 2f has a cylindrical protrusion 2g that fits into the hollow interior of the elongate body 2a. Such an arrangement provides a means of attaching the tip and provides registration to ensure coaxial attachment the tip 2f to the elongate body 2a. Protrusion 2g also provides additional contact surface between the tip 2f and elongate body 2a which can be further secured with an optional adhesive.

Preferably, the tip 2b of such projectiles has a higher density than the elongate body 2a. In certain embodiments, the tip 2b has a mass that is equal to or greater than the mass of the elongate body. For example, in certain embodiments, the mass of the tip is between 1× and 5× the mass of the elongate body. In certain embodiments, the tip is between 1.2× and 1.6×, between 1.5× and 2×, between 1.8× and 2.5×, between 2× and 3×, or between 3× and 5× the weight of the elongate body.

Figure 2E:
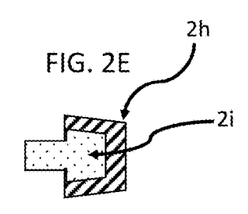
FIG. 2E shows a cross section of an alternate projectile tip construction.

FIG. 2E shows a cross section of an alternate construction of a dart tip—in this arrangement, the tip comprises a hollow shell 2h with a solid interior 2i composed of a material different from that of the shell. Preferably, the core 2i is a higher density material (e.g. a compressed seed/growing media pellet) than the shell 2h which is preferably made of a soft material (e.g. made of foam). A tip of this design can be attached to an elongate body as describe below and shown in FIG. 2D.

Figure 3A:
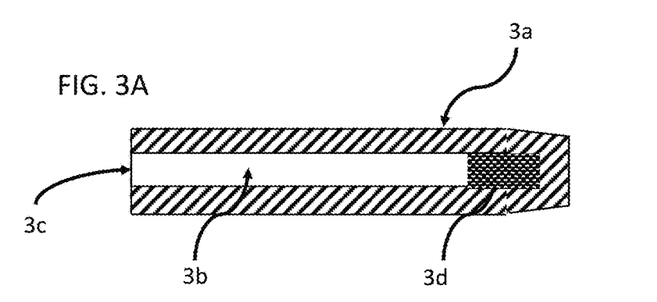
FIG. 3A shows a longitudinal section view of an alternative construction of a projectile according to certain embodiments of the present invention.

FIG. 3A shows an example of a dart-like projectile that has a monolithic construction. In this method of constructing the projectile, the tip and the elongate body are a single part denoted 3a. As in previous figures, the projectile has an inner hollow here denoted 3b and an opening 3c. In certain embodiments, the monolithic body 3a is composed of uniform material and may be for example molded as a single part. FIG. 2E also illustrates the presence of a cylindrical element 3d, but this is optional. If element 3d is present, it may contain the viable seeds, soil, and/or fertilizer. This arrangement of a monolithic body and separate cylindrical element has advantages for simplicity of manufacture and the feature that seeds of different varieties can easily be incorporated without the need to change the composition of the body 3a.

In another embodiment, the present invention provides biodegradable spherical projectiles designed to be launched from toy guns. This embodiment provides an environmentally friendly alternative to available plastic ammunition sold for existing toy guns and launchers. There are existing toys in the marketplace that are designed to propel lightweight plastic or foam balls. Similar to the dart projectiles described above, these spherical polymer projectiles are benign enough to launch at playmates in mock battles. Existing spherical polymer projectiles can be divided into two categories based on their size and re-usability. A first category of existing projectile comprises larger spherical projectiles (e.g. with diameter greater than about 10 mm) there are made out of resilient foam. These are sold and used in a manner similar to the darts described above and are intended to be collected and re-used multiple times. In addition, there exists a second category of toys designed to propel much smaller spherical projectiles (e.g. with diameters of 10 mm or less) for which there is often no expectation the ammunition will be collected and re-used thus exacerbating the potential environmental harms associated with the products. Additionally, for the smaller sizes of ammunition there is a concern that birds or other wildlife may ingest the plastic by mistaking them for food, by accident, or out of curiosity. These small spherical projectiles are often made of rigid thermoplastics and are therefore resilient to abrasion and physical wear which increases their persistence in the environment. Their small size and spherical shape also facilitate mobility in the environment and such projectiles can become widely distributed in the environment carried by water, wind or gravity. In certain embodiments, the present invention provides spherical biodegradable projectiles comprising viable plant seeds which are suitable for use in toy guns that typically propel spherical plastic or foam projectiles. In certain embodiments, such biodegradable projectiles are characterized in that they are manufactured with sufficient size tolerance to operate in toy guns or launchers having a mechanism or barrel configured such that only spheres with a narrow range of diameters will function as ammunition. This differentiates the inventive spherical projectiles provided herein from prior art 'seed bombs' which may be generally spheroid in shape but which lack the geometric regularity and size tolerances to function as projectiles for the toys described above. In certain embodiments, the provided biodegradable seed-containing spherical ammunition is further characterized in that it has sufficient mechanical integrity to prevent disintegrating of the projectile in a magazine, hopper, or other mechanism feeding projectiles to a launching mechanism in such toys. Again, this differentiates the provided projectiles from prior art seed bombs designed to be thrown or launched from a slingshot or similar apparatus that does not require that the projectile be dispensed from a magazine or similar mechanism. In addition, such prior art seed bombs are typically rather friable—while this factor does not diminish their utility for their intended purpose, it renders them unsuitable for use in the toy guns and launchers that require precise projectiles with robust handling characteristics.

In certain embodiments, the present invention provides biodegradable spherical projectiles for launch from toy guns and similar toy weapons. In certain embodiments, the projectiles are characterized in that they have a diameter less than about 10 mm. For example, a diameter between about 2-5 mm, between about 3-8 mm, between about 5 and 10 mm, or between about 7 and 9 mm. In certain embodiments, the projectiles are characterized in that they have a diameter of 6 mm. In certain embodiments, the projectiles are characterized in that they have a diameter of 8 mm. In certain embodiments, the present invention provides a pack of such projectiles, the pack comprising a plurality of projectiles with substantially the same diameter. In certain embodiments, such packs comprise more than 10, more than 25, more than 50 more than 100, more than 500, or more than 1000 such projectiles. In certain embodiments, such packs are characterized in that the individual projectiles vary in size by less than +/−10% of their diameter, by less than +/−5% of their diameter, by less than +/−2% of their diameter, by less than +/−1% of their diameter, by less than +/−0.5% of their diameter, by less than +/−0.25% of their diameter, by less than +/−0.10% of their diameter, by less than +/−0.05% of their diameter, or by less than +/−0.01% of their diameter.

In certain embodiments, provided spherical projectiles are substantially rigid. In certain embodiments, the biodegradable spherical projectiles are monolithic (i.e. they are composed of a uniform composition throughout). In certain embodiments, the biodegradable spherical projectiles comprise two or more different materials disposed in distinct areas comprising the projectile. In certain embodiments, such projectiles comprise two or more layers comprising different materials. In certain embodiments, such projectiles comprise a spherical core covered by one or more spherical layers. In certain embodiments, such projectiles comprise a hollow core. In certain embodiments, provided spherical projectiles comprise a composite of material containing smaller particles of one or more materials randomly or regularly distributed in a matrix of a first material. In certain embodiments such projectiles have a smooth outer surface. In certain embodiments, the smooth outer surface comprises a coating disposed on the exterior of a core of material of different composition than the coating. In certain embodiments, the coating is biodegradable. In certain embodiments, the coating is water soluble or water swellable.

Figures 4A, 4B, 4C:
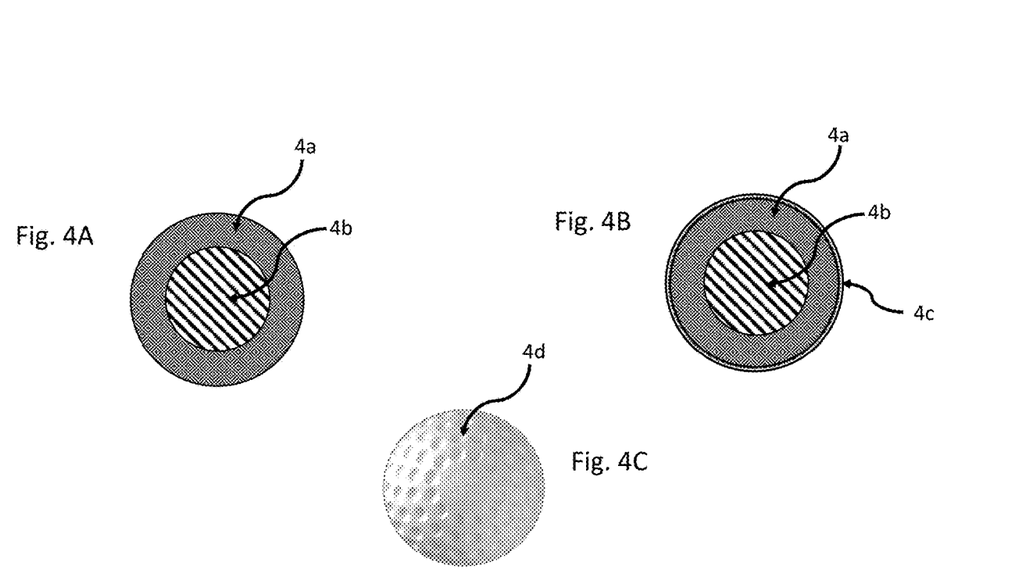
FIG. 4A shows cross section of a spherical foam projectile according to embodiments of the present invention.
FIG. 4B shows cross section of an alternate spherical foam projectile according to embodiments of the present invention.
FIG. 4C shows surface texture of a spherical projectile according to embodiments of the present invention.
Figure 4D:
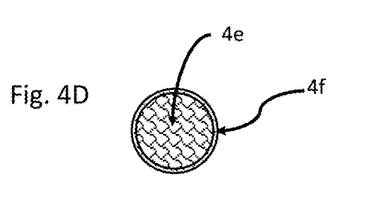
FIG. 4D shows a cross section of a spherical BB according to embodiments of the present invention.

FIG. 4C depicts a cross section of a spherical projectile according to the present invention. The projectile comprises a core 4e comprising a seed-containing medium surrounded by thin degradable coating 4f. In certain embodiments, the core comprises a clay based growing medium containing viable seeds. In certain embodiments, the coating comprises a polymer composition designed for seed coating as more fully described below. Preferably, the coating has a smooth exterior surface such that the projectile comprises a smooth sphere with tight dimensional tolerances as described above.

In certain embodiments, provided biodegradable spherical projectiles are characterized in that they have sufficient mechanical properties to permit their bulk handling and/or utilization in mechanical loading mechanisms without extensive breaking, chipping, or crumbling. In certain embodiments, such spherical projectiles are characterized in that they are substantially rigid. In certain embodiments, such spherical projectiles are characterized in that they are elastomeric. In certain embodiments, provided biodegradable spherical projectiles are characterized in that they are of sufficient resilience to survive handling and manipulation in a toy gun or launcher (e.g. in a magazine, hopper or loading mechanism) without substantial damage. In certain embodiments, such projectiles are further characterized in that they have low enough strength that they can be broken or pulverized when propelled from a toy gun against a hard surface.

In certain embodiments, the present invention provides biodegradable spherical foam projectiles for launch from toy launchers and similar toy weapons. In certain embodiments, the spherical foam projectiles are characterized in that they have a diameter greater than about 10 mm. For example, a diameter between about 10 and 50 mm, between about 10 and 40 mm, between about 10 and 30 mm, between about 20 and 30 mm, between about 20 and 25 mm, or between about 30 and 40 mm. In certain embodiments, such spherical projectiles are composed of a biodegradable foam or similar low-density biodegradable composition. In certain embodiments, the biodegradable spherical foam projectiles are monolithic (i.e. they are composed of a uniform composition throughout). In certain embodiments, the biodegradable spherical projectiles comprise two or more different materials disposed in distinct areas comprising the projectile. In certain embodiments, provided spherical foam projectiles comprise two or more layers comprising different materials. In certain embodiments, such projectiles comprise a spherical core covered by one or more spherical layers. In certain such embodiments, at least one of the layers is not a foam. In certain embodiments, the outermost layer of the projectile comprises a foam and one or more inner layers are not a foam. In certain embodiments, provided spherical projectiles are hollow. In certain embodiments, provided spherical projectiles comprise a composite of material containing smaller particles of one or more materials randomly or regularly distributed in a matrix of a distinct first material.

FIG. 4A depicts the cross section of a multilayer spherical projectile according to certain embodiments of the invention—the projectile has a core 4b surrounded by an outer layer 4a. In certain embodiments, the core 4b comprises a denser material than outer layer 4a. In certain embodiments, the core comprises compressed growing medium containing seeds, and the outer layer 4a comprises a soft resilient material such as a biodegradable foam.

In certain embodiments, provided spherical foam projectiles have a smooth outer surface. In certain embodiments, the smooth outer surface comprises a coating disposed on the exterior of an interior material of different composition than the coating. FIG. 4B depicts a cross section view of a projectile similar to that shown in FIG. 4A and comprising an exterior coating 4c disposed over the outer layer 4a. The exterior painting may comprise a paint, moisture control coating or other similar material as further described below.

In certain embodiments, embodiments provided spherical foam projectiles have a textured outer surface. In certain embodiments, such textures comprise dimples, ridges, grooves, or similar features that improve the aerodynamics of the spherical projectile. FIG. 4C shows one example of such an exterior texture, as depicted the projectile is covered by a plurality of small dimples 4d.

Materials of Construction

In contrast to prior art projectiles currently marketed for launching toys, the projectiles disclosed herein are composed of benign materials and are designed to break down by natural environmental processes.

In certain embodiments, the projectiles contain viable plant seeds such as those of flowers or grasses. In certain embodiments, the projectiles contain viable spores of mosses or ferns. In certain embodiments, the projectiles contain other plant propagative material such as root fragments, rhizomes, or bulbs. In certain embodiments, the projectiles comprise the spores or mycelia of mushrooms or other fungi such that on decomposition, the dart propagates a fungal colony (i.e. of edible mushrooms or beneficial mycorrhizal fungi). In certain embodiments, projectiles of the invention comprise propagative material of two or more of the categories described above, for example flower seeds and mycorrhizal fungi, or fern spores and moss fragments, or grass seeds and moss spores. These propagative materials are preferably present in a form and arrangement that allows them grow as the projectile biodegrades and thereby enhance the environment.

The term 'Biodegradable' as used herein means a material will degrade by natural processes into benign end products. In certain embodiments, the projectiles (or components thereof) are "biodegradable and compostable," according to ASTM D6400. In certain embodiments, the projectiles (or components thereof) are "biodegradable according to EN13432, or a comparable standard, for bio-degradability. In certain embodiments, the projectiles (or components thereof) are characterized in that at 90% of the mass, is converted to $CO_2$ within 6 months. In certain embodiments, the projectiles (or components thereof) are characterized in that after 3 months of composting and subsequent sifting through a 2 mm sieve, no more than 10% residue, by mass, remains.

In its broadest sense, the present invention does not particularly limit the identity of the biodegradable material from which the projectiles are made. Many biodegradable materials are known and can be adapted according to the principles described herein. In certain embodiments, the projectiles comprise two or more different biodegradable materials. These different biodegradable materials may be present as different distinct parts of the projectile or they may be combined in a biodegradable composite from which the projectile or a portion thereof is made. In certain embodiments, the entire projectile is composed of biodegradable materials. In other embodiments, only a portion of the projectile is biodegradable. In certain embodiments, the projectiles comprise natural materials that are benign to the environment, but do not biodegrade per se (i.e. sand, clay, minerals, pigments, vermiculite, perlite and the like).

In certain embodiments, projectiles of the present invention comprise a growing medium. In certain embodiments, projectiles of the present invention comprise a growing medium selected from the group consisting of: soil, peat moss, sphagnum moss, compost, dehydrated manure, biochar, vermiculite, perlite, clay, charcoal, coconut fiber, tree bark, coir, wood fiber, bagasse, other plant fiber, and blends of any two or more of these. In certain embodiments, projectiles of the present invention comprise peat moss, or a peat moss based growing medium. In certain embodiments, projectiles of the present invention comprise coconut fiber, or a coconut fiber-based growing medium. In certain embodiments, projectiles of the present invention comprise soil, or a soil-based growing medium. In certain embodiments, projectiles of the present invention comprise manure, or a manure-based growing medium. In addition to these materials a growing medium utilized in construction of the provided biodegradable projectiles may contain other materials beneficial to plant growth such as fertilizers, soil microbiota such as mycorrhizal fungi or beneficial soil bacteria, water retention aids such as superabsorbent polymers, vermiculite, perlite, or charcoal, or germination aids such as wetting agents, fungicides, plant growth regulators and the like. In certain embodiments, such growing media are present in the projectile in a form that is substantially dehydrated such that seed in contact with the medium will not have sufficient moisture to begin germinating or loose its viability at an accelerated rate on storage.

In certain embodiments, such growing media are present in a compressed form. In certain embodiments, such compressed growing media contain binders, adhesives, coatings or similar materials that allow them to retain their compressed form. In certain embodiments, a binder or adhesive is selected from the group consisting of: polyvinyl alcohol, polyvinyl acetate, hide glue, polyacrylic acid, carrageenan, cellulose, hydroxymethyl cellulose, starch, latex, shellac, linseed oil, wax, soy powder, xanthan gum, guar gum, agar, gelatin, psyllium husk, flax meal, ground chia seed, gluten, arrowroot, tapioca, egg whites, clays and mixtures containing any two or more of these. In certain embodiments, the binders or adhesives are characterized in that when the compressed medium comes into contact with moisture for an extended period, the binder or adhesive softens, dissolves, or degrades thereby allowing the compressed medium to swell and/or moisten.

In certain embodiments, projectiles of the present invention contain compressed growing medium comprising at least one component selected from the group consisting of: soil, peat moss, sphagnum moss, compost, dehydrated manure, biochar, vermiculite, perlite, clay, coconut fiber, bark, charcoal, wood fiber, bagasse, coir, and other plant fibers. In certain embodiments, such compressed growing medium contains one or more additional components selected from the group consisting of: fertilizers, mycorrhizal fungi, beneficial soil microbes, water retention aids, superabsorbent polymers, wetting agents, fungicides, plant growth regulators, binders, and adhesives. In certain embodiments, such compressed growing medium is further characterized in that it is substantially dry and contains viable plant seeds.

In certain embodiments, biodegradable projectiles of the present invention comprise a biodegradable polymer. A large number of biodegradable polymers are known, and the available list of suitable materials continues to grow as new biodegradable polymers are brought to market. Non-limiting examples of polymers than may be utilized in construction of the provided projectiles include: polylactic acid (PLA), polyhydroxybutyrate (PHB), polypropylene carbonate), polyglycolic acid (PGA), polybutylene succinate (PBS), polycaprolactone (PCL), poly(propiolactone) (PPL), Poly (vinyl alcohol) (PVA), Polybutylene adipate terephthalate (PBAT), polyacrylic acid (PAA), and copolymers, composites or mixtures of any two or more of these. Such polymers may be present as films, molded or extruded parts, the polymers may also be present as foams (e.g. closed cell foams, open cell foams, microcellular foams, and may be flexible, rigid, or viscoelastic)

In certain embodiments, biodegradable projectiles of the present invention comprise a natural polymeric material such as starch, cellulose, or lignin. In certain embodiments, biodegradable projectiles comprise a plant-derived material such as bagasse, cork, coconut fiber, bark, cotton, wood, straw, peat moss, sphagnum moss, and similar substances. In certain embodiments, biodegradable projectiles of the present invention comprise mycelium or similar fungus derived material, for example a fungal composite material such as those used for packaging materials (e.g. such as materials marketed by Ecovative Inc.). In certain embodiments, biodegradable projectiles of the present invention comprise paper, pulp, papier mâché, cardboard, pasteboard or similar materials.

In certain embodiments, biodegradable projectiles of the present invention are constructed of two or more separate materials. For example, with reference to the elongate dart-like projectiles described above, the tip and the body may have different compositions. Likewise for the spherical projectiles described above, they may comprise a core of a first material encased by one or more layers comprising different materials. In certain embodiments, where the provided projectile comprises two or more different materials, such different materials are selected to have different densities. For example with reference to the dart-like projectiles in certain embodiments, the tip may be composed of a material having a higher density than the elongate body. Such density distributions can improve the aerodynamics and/or accuracy of the projectile. Likewise, for spherical projectiles, in certain embodiments a core is composed of a material having a higher density than one or more layers surrounding it.

In certain embodiments, a portion of the biodegradable projectile comprises compressed growing medium having a first density in combination with at least one additional material having a density that is lower than the density of the compressed growing medium. In certain embodiments, provided biodegradable projectiles comprise a combination of compressed growing medium and a biodegradable foam having a density lower than that of the compressed growing medium. In certain embodiments, provided biodegradable projectiles comprise a combination of compressed growing medium and one or more components comprising paper, pulp, papier mâché, cardboard or cork and having a density lower than that of the compressed growing medium.

As noted above, in one aspect the present invention provides biodegradable projectiles that contain viable plant seeds. No specific limitations are placed on the types of seeds or their location in the projectile, however in certain preferred embodiments, the seeds are present in such a disposition that if the projectile is left out of doors exposed to the elements they are able to germinate and grow into plants. In certain embodiments, the seeds are those of flowers or grasses. In certain embodiments, the projectiles are designed to be marketed in specific geographies and contain seeds of plants native to area where they are intended to be sold; for example native wildflowers or native grasses. In certain embodiments, the seeds are those of annual flowering plants. In certain embodiments, the seeds comprise spores of ferns, mosses, or clubmosses (in certain embodiments such spores are considered to be seeds within the meaning of the invention). In certain embodiments, the seeds comprise viable fragments of mosses or liverworts that are capable of growing and establishing moss or liverwort colonies (in certain embodiments such viable plant fragments are considered to be seeds within the meaning of the invention). In certain embodiments, the seeds comprise root fragments, rhizomes, bulbs, bulblets, or similar propagative plant matter capable of growing and establishing a plant (in certain embodiments such propagative plant matter is considered to be seeds within the meaning of the invention). In certain embodiments, the projectiles comprise a mixture of seeds of two or more different species or varieties of plant. In certain embodiments, the projectiles comprise a mixture of seeds of different types of flowers with the same colors (e.g. white, pink, blue, etc.) In certain embodiments, a surface of such projectiles are colored to indicate which color of flower seeds are contained therein. In certain embodiments, such colored projectiles are sold in collections containing a plurality of projectiles of the same or different colors. For example a package might contain a number blue darts and white darts which contain seeds of the corresponding color and which would lead to a mixture of blue and white flowering plants when the darts biodegrade.

In a broad sense of the present invention, the seeds may be present in any part of the projectile. In certain embodiments, the seeds are present in a specific portion of the projectile and are situated in such a way to enhance their chance of germination. In certain embodiments, the seeds are embedded in a material composing the projectile such that they do not protrude beyond an exterior surface of the projectile since this may lead to physical damage of the seeds or loss of seed viability, or may interfere with the operability or aerodynamics of the projectile. In certain embodiments, the seeds are present in the projectile embedded in compressed growing medium that composes at least a portion of the projectile. In certain embodiments, the seeds are embedded in another matrix such as paper, pulp, papier mâché, biodegradable foam and the like. In certain embodiments, where seeds are embedded in a matrix, the seed containing matrix is coated with a material to provide a smooth surface, and or to control moisture uptake by the matrix or to control the degradation rate of the matrix. In certain embodiments, the seeds are present in a space or void provided within the projectile (e.g. inside a hollow center of a tip or a inside a hollow spherical projectile.

In certain embodiments, one or more parts of the projectile are coated with a material to provide a smooth surface, and or to control moisture uptake or to control the degradation rate of the coated substance. It has been found that polymer coatings developed for seed treatment applications are particularly suitable for this purpose. While such coatings are normally applied directly to seeds, in this application the seed coating is instead applied to a matrix containing the seeds rather to the seeds themselves. In certain embodiments, projectiles of the present invention comprise compressed growing medium containing seeds that has been coated with a polymer coating to control moisture uptake, improve aesthetics and/or provide a smoother more aerodynamic surface to the projectile. Suitable polymer compositions for this purpose are marketed by a number of companies. Examples include PolySelect™ brand seed coating polymers (Germains Seed Technology Inc.); Disco™ brand coatings (Incotec, BV), Flo Rite brand coatings (BASF, Inc.) and other similar products. In certain embodiments a waterborne latex paint is utilized as a coating.

Methods

In another aspect, the present invention provides methods of making biodegradable projectiles which optionally contain viable plant seeds or other propagative materials.

In certain embodiments, the present invention provides methods of making dart-like biodegradable projectiles. In certain embodiments, the method comprises the steps of making an elongate tube from a biodegradable material, making a tip from a second biodegradable material, and bonding the tip to one end of the elongate tube.

In certain embodiments, the method includes the step of compressing a mixture of growing medium, seeds, and an optional binder to form a component of the projectile. In certain embodiments, the step of compressing the mixture comprises pressing the mixture into a mold to form a component. In certain embodiments, the compressed component is a dart tip. In certain embodiments the method further includes one or more steps of de-molding the tip, heating, curing, drying, and or coating the compressed tip.

In certain embodiments, the step of forming the projectile comprises growing fungal mycelia in a mold.

In certain embodiments, the step of forming the elongate tubular body comprises cutting a length of extruded or molded biodegradable foam tubing to length. In certain embodiments, the step of forming the elongate tubular body comprises molding, cutting or forming the tubular body. In certain embodiments, the step of molding the body comprises curing a foam composition in the mold. In certain embodiments, the step of forming the elongate tubular body comprises growing fungal mycelia in a mold. In certain embodiments the method further includes one or more steps of de-molding the mycelia from the mold and, heating, curing, drying, and or coating the molded body.

In certain embodiments, the method includes forming a pellet of compressed growing medium containing seeds and placing the pellet in the tip or within the tubular elongate body.

In certain embodiments, methods of the invention included making an elongate tubular body of corrugated cardboard. In certain embodiments, such methods include providing a craft paper straw, evenly adhering a corrugated paper layer to the outside surface of the straw and covering the corrugated paper layer with craft paper. In certain embodiments, the method includes introducing materials into the corrugation channels of cardboard (e.g. seeds, growing media, fertilizers, etc). In certain embodiments the method includes the step of sealing the corrugated ends (e.g. with paper)

In certain embodiments, the method includes the step of coating part of all of the projectile with a moisture-controlling coating such as a wax, oil, paint, shellac, varnish, polymer, seed coating polymer formulation, or other similar coating material.

In certain embodiments, methods of the present invention include a step of molding biodegradable foam around a core comprising compressed growing medium and seeds.

The steps described above and additional methods and refinements are described in more detail in the examples that follow.

EXAMPLES

The following non-limiting examples demonstrate features of representative projectiles constructed according to the inventions as well as methods of making them.

Examples 1-16, Biodegradable Foam Darts Containing Viable Seeds. These examples describe materials of construction methods to produce a variety of projectiles according to the present invention. The projectiles of these examples are suitable for use with existing toy launchers that propel foam darts such as those marketed as Nerf® brand toys.

Example 1

Manufacture of a biodegradable seed-containing projectile darts. This example demonstrates construction of dart-shaped projectiles that have a biodegradable pre-formed foam body attached to a separately formed tip composed of compressed growing medium containing viable seeds.

Manufacture of the foam dart body: A variety of biodegradable foam compositions are extruded into tubing with a diameter of 0.50±0.05 inches and a wall thickness of 0.125±0.05 inches. To make bodies for the darts, lengths of the tubing are cut to 2.5±0.1 inches with the ends square to the length of the tube. In a first set of examples, the foam utilized is a high amylose starch (HAS) foam (e.g. Green Cell Foam™ provided by KTM Industries, 3327 Ranger Rd., Lansing, Mich. 48906 www.ktmindustries.com). In a second set of examples, the foam used is a glycerol-citric acid polyester (GCAP) closed cell foam (e.g. such as described in published US patent application 20190225767A1). The foam dart bodies have average weights between 0.18 g and 0.32 g. In a third and fourth set of examples, the foam tubing is coated with a thin biodegradable polymer film as described in published US patent application US20200017258A1 this can be done during extrusion, after extrusion or after cutting. The dart bodies are optionally further treated by coating surfaces (e.g. the inside bore and/or cut ends and/or exterior surface with a polymer seed coating formulation. Including the polymer film and/or polymer coatings makes the darts more resilient by preventing 'sanding' (e.g. reducing friability that leads to shedding of small particles of foam), and makes the darts less sensitive to humidity or small amounts of moisture while maintaining their biodegradability.

Manufacture of the tip: Milled peat moss (100 g), finely ground vermiculite (10 g), and 1 g of mixed grass and flower seeds that are small enough to pass through a #10 mesh screen are gently mixed. To this mixture, is a 1:10 dilution of PVA glue in water is added until the mixture is barely moist. A portion of the mixture is evenly distributed into a multiwell Teflon-coated steel mold plate having 36 0.5" diameter bullet-shaped mold cavities. A matching Teflon-coated steel die plate having 36 0.490" diameter dies aligned to engage with the mold cavities is then pressed onto the mold compressing the mixture in each mold under a pressure of 500 lb/int held for 3 minutes. The die plate in this example is pressed to a depth such that each die is 0.25" above of the bottom of the mold cavity; each die has a 0.25" diameter by 0.30" deep recess in its center which forms a boss of the same diameter on the back of each tip. The resulting tips have a cross section similar to that shown as tip 2*f* in FIG.

2D. The mold is removed from the press and, after separation from the die plate, is dried in a convection oven at 35° C. for 6 h. The compressed tips are then removed from the mold and allowed to dry in a dehumidified chamber for an additional 48 h. The pressed tips have a weight of approximately 0.8 g and have a smooth even surface. The tips are gently tumbled at low speed and lightly coated by spraying Polyselect™ 300 series seed coating formulation into the tumbler. The Polyselect is added in small portions until the tips are evenly coated. The coated tips are removed from the tumbler placed on a non-stick mesh under air flow until dried.

Projectile assembly: The 0.25" diameter boss of a coated tip is dipped in PVA glue and pressed into one end of a cut HAS foam tube until the back of the tip is in contact with the end of the tube excess glue is wiped from the exterior of the projectile and light pressure is applied to the tip until the glue has bonded. This completes the projectile.

Testing: A random sample of 50 of the darts manufactured according to Example 1 are loaded into a Nerf® brand Elite™ blaster. The darts load into the magazine of the blaster and can be launched similarly to prior art petroleum-based darts. A random sample of 20 darts according to Example 1 are left exposed on bare soil in temperate rainy weather for 6 weeks. The tips swell and absorb water within several days upon being moistened by rain and dew. Seeds contained within the tip begin to germinate and grow in the third to fifth weeks demonstrating that the projectile is biodegradable and contains viable seeds.

To test the germination rate and viability of the seeds in the tips from Example 1, individual dart tips are placed on sterile growing media in 2" square pots. The pots are thoroughly watered and a glass plate is placed over the pots to retain moisture. As a control, a pinch of the seed mixture used to manufacture the tips is planted in separate 2" square pots and treated identically. The germination rate of the tips is similar to that of the seed mixture demonstrating that the seeds in the tips are viable and the manufacturing process does not damage the seed. The same experiment is repeated at monthly intervals and demonstrates the shelf life of the viable seed-containing projectiles is similar to that of bare seed stored under similar temperature and humidity.

Examples 2 to 10

Table 1 below summarizes additional compositions for biodegradable seed containing projectiles suitable for use with existing toy launchers that propel foam darts. These examples are made according to procedures described in Example 1A by substituting materials of construction and, where necessary modifying conditions such as time, temperature, and pressure.

TABLE 1

| Example | Tip composition (mass) | Body composition | Tip coating |
|---|---|---|---|
| 2 | ground coir fiber, seeds, PVA glue (100:1.5:0.1) | Biodegradable foam | shellac |
| 3 | Ground dehydrated cow manure, seeds, carrageenan (100:2:1) | Biodegradable foam | gelatin |
| 4 | Compressed potting soil, seeds, PVA glue (100:2:1) | Biodegradable foam | Latex paint |
| 5 | Ground dehydrated cow manure, peat moss, sand, seeds, PVA glue (10:80:10:2:1.5) | Biodegradable foam | Hydroxymethyl cellulose |
| 6 | Peat moss, macerated live moss, sand, polyacrylic acid (100:10:20:3) | Biodegradable foam | Bee's wax |
| 7 | Peat moss, sand, polyacrylic acid, fern spores (100:10:0.01) | Biodegradable foam | Neets foot oil |
| 8 | ProMix™ BX, seeds, PVA glue (100:2:1) | Biodegradable foam | Linseed oil |
| 9 | ProMix™ BX growing medium, seeds, polyacrylic acid, hydroxymethyl cellulose (100:2:0.55:0.5) | Biodegradable foam | PolySelect® seed coating polymer |
| 10 | Vermiculite, seeds, hydroxymethyl cellulose (100:10:2) | Biodegradable foam | Florite® seed coating polymer |

Example 11

Biodegradable darts made from 'foamed in mold' components. In this example, a biodegradable foam is produced and cured in a suitably shaped mold and cured in place to form a biodegradable dart.

Manufacture of molded foam darts: Powdered rice starch, calcium carbonate, glycerol, glycidol methacrylate and water (in a weight ratio of 100:8:5:5:30) are well mixed to form a foam precursor mixture. This mixture is pressed into a mold at a pressure of 20-100 kg/cm$^2$ and temperature of 120-180° C. to form dart bodies with an outside diameter of 0.5", a length of 2.8" and a hollow core 0.25" in diameter and 2.6" long. These darts are molded with integral tips and are similar to the projectile shown in FIG. 3A. After curing, the darts are de-molded, dried, and optionally coated with a coating as described in previous examples.

Manufacture of seed pellets: the mixtures of seeds and growing media described in Examples 1 to 10 are pressed into a mold to make compressed pellets 0.25" in diameter by 0.4" long. The pellets are dried and then optionally coated as described in Example 1.

Assembly of projectile: The dried seed/media pellet is placed in the open end of the hollow core of the molded foam dart and inserted into the body until it contacts the bottom of the center hole near tip of the projectile as shown in FIG. 3A. This completes assembly of the projectile.

Example 12

Figure 3B:
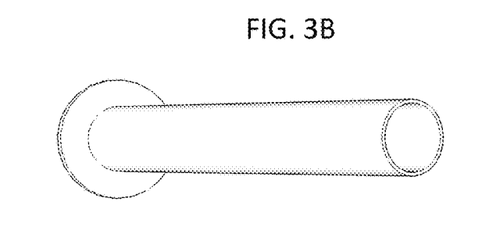
FIG. 3B shows an orthogonal view of a biodegradable plastic liner tube described in Example 12.

Projectiles with a plastic liner tube. The projectile of this example is produced as in Example 11, except a biodegradable plastic tube having an inside diameter of 0.25", a length of 2.6" and with one closed end is centered in the mold (with the closed end toward the tip) prior to adding the foaming composition. When the foam sets the plastic tube is embedded in the body of the dart and serves as the hollow inner cavity. Having a plastic liner within the dart improves the reliability of the projectile's engagement with the mechanism of the launching toy and in some instances increases the distance the projectile is launched vs. similar un-lined projectiles. The liner tube may also comprise a widened flange surrounding one end as shown in FIG. 3B. It is advantageous if this flange is the same diameter as the outer diameter of the dart body in which case the flange provides reinforcement to the rear end of the projectile.

A similar biodegradable plastic liner tube can be inserted into projectiles made by methods of the other examples herein. In certain such cases, adhesive may be used to secure the liner tube in the hollow dart body.

Example 13

Darts made of mycelial foam. As mentioned above, mycelial composite materials can be useful for construction of projectiles of the present invention. Similar mycelial composites are used as biodegradable packaging materials and typically consist of ground plant fibers (e.g. wheat straw, corn stover, hemp fiber or seed husks) which is sterilized, moistened and inoculated with fungal spores or mycelia and placed loosely in a mold. The fungal mycelia grow on the plant fibers filling the void space to create a solid mass that conforms to the shape of the mold. Once removed and dried, the material is a low density foam like material.

A mycelial foam growth kit obtained from Ecovative Design Inc. (70 Cohoes Ave., Green Island, Ny 12183, www.Mushroompackaging.com, www.Grow.bio) was used according to instructions and the inoculated mixture placed a plastic mold describe with the same dimensions and shape as the mold described in Example 11. After growing in the mold for 5 days, the dart bodies were demolded dried under ambient conditions for 2 days, then heated to 90° C. for 2 h. The completed bodies are then coated with a commercial seed coating polymer to seal the surfaces and provide a smooth finish. The darts may be used as-is at this stage, or a seed/growing medium pellet may be inserted as described in Example 11.

Example 14

This example is performed according to the procedures in Example 13, except the mycelial foam is formed in a mold to provide a hollow tubes having the dimensions described in Example 1. These hollow tubes are then glued to tips constructed from growing media, seeds, and binders as described in Examples 1-10.

Example 15

Projectile darts comprising cardboard bodies. In this example, two part projectiles are produced utilizing corrugated cardboard for the dart body.

Formation of the dart body. To the outer surface of a craft paper tube having an inner diameter of 0.25" and a length of 10.5" is adhered a corrugated paper layer having a corrugation height just under 0.125". The corrugated layer is arranged so that an integer number of corrugations fit evenly around the tube thereby providing an radially symmetric distribution of weight. This assembly is spirally wrapped with an outer layer of craft paper to provide a hollow corrugated cardboard tube with an inner diameter of 0.25" and an outer diameter of 0.50". The finished tube is cut into 4 square ended pieces having lengths of 2.6".

Molded seed-containing tips made from compressed growing media are then glued to one end of the cardboard tubes to complete the assembly Additional optional steps may be performed to improve performance of these projectiles. For example, the cardboard tubes may be with a water-resistant coating such as those described in Examples 1-10; one or both ends of the cardboard tubes may be sealed by gluing an end piece to seal off the corrugation channels.

Example 16

Projectiles with seeds contained in a corrugated cardboard body. A corrugated dart body is prepared as in Example 15, and seeds are inserted into the corrugation channels prior to sealing the ends. Preferably, this is done evenly such that each corrugation channel receives an equal mass of seeds since this maintains balance and improves aerodynamics of the projectile. In a variation, the seeds are added to the corrugation channels with a binder or adhesive and are placed at the end of the tube closest to the tip—this prevents the seeds from moving during use and provides additional weight at the front of the dart, both of these features improve the projectile's performance.

The seed containing cardboard projectile body can be joined with any of the tips describe above, or can be capped with a simple tip made of biodegradable foam, cork, wood or any other suitable material.

Example 17

Biodegradable BBs Containing Viable Seeds. These examples describe materials and construction methods to produce a variety of spherical projectiles according to the present invention. The projectiles of these examples are suitable for use with existing toy guns that propel plastic balls such as Airsoft® brand air guns which shoot 6 mm diameter BBs.

A mixture of dry clay, powdered peat moss, seeds (a mixture of flower and grass seeds) and hydroxymethyl cellulose powder (100:20:5:5) is thoroughly mixed and then moistened with a minimal amount of water. The resulting plastic mixture is molded to form 6.05 mm spheres. The spheres are dried in a convection oven at 35° C. for 24 h. These rough cores are then placed in a rotary tumbler and polished until the diameter is reduced within specification. A coating of Polyselect™ 300 series seed coating polymer is then sprayed into the tumbler and once the pellets are evenly coated they are removed and allowed to dry under ambient conditions. The finished pellets have a smooth surface, weigh 0.3 g and have a diameter of 5.95±0.02 mm.

Example 18

Biodegradable Spherical Foam Projectiles Containing Viable Seeds

Manufacture of the cores: Milled peat moss (500 g), finely ground vermiculite (20 g), and 20 g of mixed grass and flower seeds that are small enough to pass through a #10 mesh screen are gently mixed. To this mixture, is a 1:10 dilution of PVA glue in water is added until the mixture is barely moist. The mixture is pressed into molds under 500 psi pressure to form 0.5" spheres. The mold is removed from the press and, after separation from the mold, the cores are dried in a convection oven at 35° C. for 6 h. The cores are allowed to dry in a dehumidified chamber for an additional 48 h. The pressed cores weight of approximately 1.2 g and have a smooth even surface.

Foam coating: the cores are placed in a Teflon coated steel bottom mold having numerous regularly spaced hemispherical depressions 0.5" in diameter. The cores are coated with a viscous biodegradable foamable composition and a Teflon-coated step top mold having 1" hemispherical depressions aligning with the centers of the depressions in the bottom plate is pressed onto the top of the bottom plate. The plates are heated and held at an appropriate temperature to cure the foam. Once the foam is cured, the mold is flipped, the bottom mold is removed and the exposed cores are coated with additional foamable composition. An identical mold with 1" hemispheric depressions is pressed on to the first mold and the foam allowed to rise and set. The spheres are next heat pressed into a dimpled 0.9" diameter spherical mold to reduced their outer diameter and provide a better outer finish. The finished spheres are optionally coated (e.g. with Polyselect™ 300 series seed coating polymer) to enhance their aesthetics and control moisture uptake by the biodegradable foam.

Table 2 details additional examples produced according to Example 18 using different core materials, foam compositions and coatings.

TABLE 2

| Example | core composition (mass) | Outer layer composition | Final coating |
|---|---|---|---|
| 19 | ground coir fiber, seeds, PVA glue (100:1.5:0.1) | Closed cell PLA foam | none |
| 20 | Ground dehydrated cow manure, seeds, carrageenan (100:2:1) | Glycerin, citric acid polyester foam | none |
| 21 | Compressed potting soil, seeds, PVA glue (100:2:1) | High amylose starch foam | Florite ® seed coating polymer |
| 22 | Ground dehydrated cow manure, peat moss, sand, seeds, PVA glue (10:80:10:2:1.5) | Mycelial foam | PolySelect ® seed coating polymer |
| 23 | Peat moss, macerated live moss, sand, polyacrylic acid (100:10:20:3) | Closed cell PHB foam | none |
| 24 | Peat moss, sand, polyacrylic acid, fern spores (100:10:0.01) | Vegetable oil-derived polyurethane foam | none |
| 25 | ProMix ™ BX, seeds, PVA glue (100:2:1) | Closed cell PHB foam | none |
| 26 | ProMix ™ BX growing medium, seeds, polyacrylic acid, hydroxymethyl cellulose (100:2:0.55:0.5) | PLA-starch composite foam | PolySelect ® seed coating polymer |
| 27 | Vermiculite, seeds, hydroxymethyl cellulose (100:10:2) | PHB-starch composite foam | Florite ® seed coating polymer |

Example 28

Foam projectiles made of mycelial foam. A mycelial foam growth kit obtained from Ecovative Design Inc. (70 Cohoes Ave., Green Island, Ny 12183, www.Mushroompackaging.com, www.Grow.bio) was used according to instructions, and the inoculated mixture placed a two piece plastic mold having a plurality of cavities for 25 mm spheres. After growing in the mold for 5 days, the spheres were demolded, dried under ambient conditions for 2 days, then heated to 90° C. for 2 h. The spheres are then coated with a PVA-based adhesive and rolled in a seed mixture. After drying, the seed-coated spheres are pressure molded in a dimpled 23 mm mold to provide balls similar to that depicted in FIG. 3C. The projectiles are then coated with Florite® seed coating polymer to provide a smooth outer surface.

It is contemplated that compositions, systems, devices, methods, and processes of the present application encompass variations and adaptations developed using information from the embodiments described in the present disclosure. Adaptation or modification of the methods and processes described in this specification may be performed by those of ordinary skill in the relevant art.

Throughout the description, where compositions, compounds, or products are described as having, including, or comprising specific components, or where processes and methods are described as having, including, or comprising specific steps, it is contemplated that, additionally, there are articles, devices, and systems of the present application that consist essentially of, or consist of, the recited components, and that there are processes and methods according to the present application that consist essentially of, or consist of, the recited processing steps.

It should be understood that the order of steps or order for performing certain action is immaterial so long as the described method remains operable. Moreover, two or more steps or actions may be conducted simultaneously.

What is claimed is:

1. A projectile configured for firing from a toy weapon, characterized in that it is substantially biodegradable and comprising:
   a. viable plant seeds
   b. a plant growing medium
   wherein:
   the projectile comprises a tubular elongate body with a tip disposed at one end;
   the end of the tubular elongate body opposite the tip is open; and
   the tubular elongate body has a hollow interior.

2. The projectile of claim 1, wherein the elongate body has a circular cross section.

3. The projectile of claim 2, wherein the tip has a circular cross section.

4. The projectile of claim 3, wherein the tip and the elongate body are substantially coaxial with respect to the centers of their circular cross sections.

5. The projectile of claim 2, wherein the cross-sectional diameter of the elongate body and the cross-sectional diameter of the tip are approximately equal or wherein the cross-sectional diameter of the tip is slightly smaller than the cross-sectional diameter of the elongate body.

6. The projectile of claim 1, wherein the tip is composed of a material of higher density than the elongate body.

7. The projectile of claim 1, wherein the tip is composed of compressed growing medium.

8. The projectile of claim 7, wherein the growing medium comprises fertilizer.

9. The projectile of claim 1, wherein the viable plant seeds are contained in the compressed growing medium.

10. The projectile of claim 1, wherein the elongate body comprises biodegradable foam.

11. The projectile of claim 10, wherein the biodegradable foam contains viable plant seeds.

12. The projectile of claim 11, wherein the biodegradable foam comprises fertilizer.

13. The projectile of claim 1, wherein the projectile comprises fertilizer.

14. The projectile of claim 1, wherein the viable plant seeds are flower seeds.

15. The projectile of claim 1, characterized in that upon being left on the ground in the presence of sufficient moisture, the viable seeds will sprout and grow.

16. The projectile of claim 1, characterized in that it is substantially composed of bio-based materials.

17. A method of planting a seed comprising launching a projectile of claim 1 from a toy weapon and leaving the projectile on the ground.

18. The projectile of claim 1, wherein the projectile a diameter of the elongate body is configured to have a sliding fit in a barrel of the toy weapon.

19. The projectile of claim 1, wherein the hollow interior of the elongate body is configured to effectively engage a propulsion mechanism of the toy weapon.

20. A method of manufacturing a biodegradable projectile for a toy comprising combining a tubular elongate body having a hollow interior and comprising biodegradable foam with a tip comprising a compressed growing medium containing viable plant seeds to provide the projectile having an opening at the end of the tubular elongate body opposite the tip.

* * * * *